(12) United States Patent
Reiser et al.

(10) Patent No.: US 7,579,098 B2
(45) Date of Patent: *Aug. 25, 2009

(54) FUEL CELLS EVAPORATIVE REACTANT GAS COOLING AND OPERATIONAL FREEZE PREVENTION

(75) Inventors: Carl A. Reiser, Stonington, CT (US); Jeremy P. Meyers, West Hartford, CT (US); David D. Johnson, Champagne, IL (US); Craig E. Evans, Vernon, CT (US); Robert M. Darling, South Windsor, CT (US); Tommy Skiba, East Hartford, CT (US); Ryan J. Balliet, West Hartford, CT (US)

(73) Assignee: UTC Power Corporation, South Windsor, CT (US)

( * ) Notice: Subject to any disclaimer, the term of this patent is extended or adjusted under 35 U.S.C. 154(b) by 803 days.

This patent is subject to a terminal disclaimer.

(21) Appl. No.: 11/230,066

(22) Filed: Sep. 19, 2005

(65) Prior Publication Data

US 2006/0141331 A1 Jun. 29, 2006

Related U.S. Application Data

(63) Continuation-in-part of application No. 11/027,332, filed on Dec. 29, 2004, now Pat. No. 7,504,170.

(51) Int. Cl.
H01M 8/02 (2006.01)
H01M 8/04 (2006.01)

(52) U.S. Cl. .................. 429/26; 429/24; 429/34; 429/39

(58) Field of Classification Search ............ 429/23, 429/24, 26, 34, 38, 39
See application file for complete search history.

(56) References Cited

U.S. PATENT DOCUMENTS

| | | | |
|---|---|---|---|
| 6,355,368 B1 | 3/2002 | Kralick | |
| 6,365,291 B1* | 4/2002 | Margiott | 429/26 X |
| 6,656,622 B2* | 12/2003 | Grasso | 429/26 |
| 6,692,854 B2* | 2/2004 | Misumi | 429/26 |
| 6,800,385 B2* | 10/2004 | Harth | 429/24 X |
| 6,986,958 B2* | 1/2006 | Reiser et al. | 429/26 X |
| 2006/0141330 A1* | 6/2006 | Reiser et al. | 429/38 |

* cited by examiner

*Primary Examiner*—Stephen J. Kalafut
(74) *Attorney, Agent, or Firm*—M. P. Williams (57) ABSTRACT

Fuel cells (38) have water passageways (67; 78, 85; 78a, 85a) that provide water through reactant gas flow field plates (74, 81) to cool the fuel cell. The water passageways may be vented to atmosphere (99), by a porous plug (69), or pumped (89, 146) with or without removing any water from the passageways. A condenser (59, 124) receives reactant air exhaust, may have a contiguous reservoir (64, 128), may be vertical, (a vehicle radiator, FIG. 2), may be horizontal, contiguous with the top of the fuel cell stack (37, FIG. 5), or below (124) the fuel cell stack (120). The passageways may be grooves (76, 77; 83, 84) or may comprise a plane of porous hydrophilic material (78a, 85a) contiguous with substantially the entire surface of one or both of the reactant gas flow field plates. Air flow in the condenser may be controlled by shutters (155). The condenser may be a heat exchanger (59a) having freeze-proof liquid flowing through a coil (161) thereof, the amount being controlled by a valve (166). A deionizer (175) may be used.

31 Claims, 7 Drawing Sheets

FUEL CELLS EVAPORATIVE REACTANT GAS COOLING AND OPERATIONAL FREEZE PREVENTION

CROSS REFERENCE TO RELATED APPLICATION

This is a continuation-in-part of U.S. patent application Ser. No. 11/027,332 filed Dec. 29, 2004, now U.S. Pat. No. 7,504,170.

TECHNICAL FIELD

This invention relates to fuel cells having water passageways that provide water to reactant gas flow passages wherein the water is evaporated in proportion to the waste heat generated in the cells; the water condensed from the exhausted reactant gas is returned to the water passageways, which may be dead-ended or vented, that receive condensate from a condenser which removes water from the air exhausting the cells.

BACKGROUND ART

It is known in the fuel cell art to evaporatively cool fuel cells, thereby deriving the benefit of the heat of vaporization, in contrast with conveying sensible heat to circulating water passing through the cells or coolant passing through coolant plates. Typically, prior approaches to evaporative cooling have taken one of two forms. In a first form, water is abundantly atomized or fogged into the gas stream of one or both of the reactant gases.

The other form of prior approaches utilizes wicking to bring water into the cells. One recent example is shown in U.S. publication 2004/0170878, which is briefly illustrated in FIG. 1 herein. A fuel cell 11 has strips of wicking 12 disposed over a diffusion layer 13 which is in intimate contact with the cathode catalyst in the membrane electrode assembly (MEA) 14. The fuel cell 11 includes an anode 18, which in the subject publication is not involved with cooling. The fuel cell is separated from the next cell in the series 20 by a separator plate 21. A similar separator plate is present, though not shown, on the top of the fuel cell as seen in FIG. 1.

To provide water to the wicking 12, a wicking header 22 extends across the ends of all of the fuel cells on an end thereof which is opposite to the flow of air into the spaces 24 between the wicking 12 that comprise the oxidant reactant gas flow field. Air is supplied by a pump 26 through a manifold 27 to the inlets 28 of each fuel cell.

Figure 1:
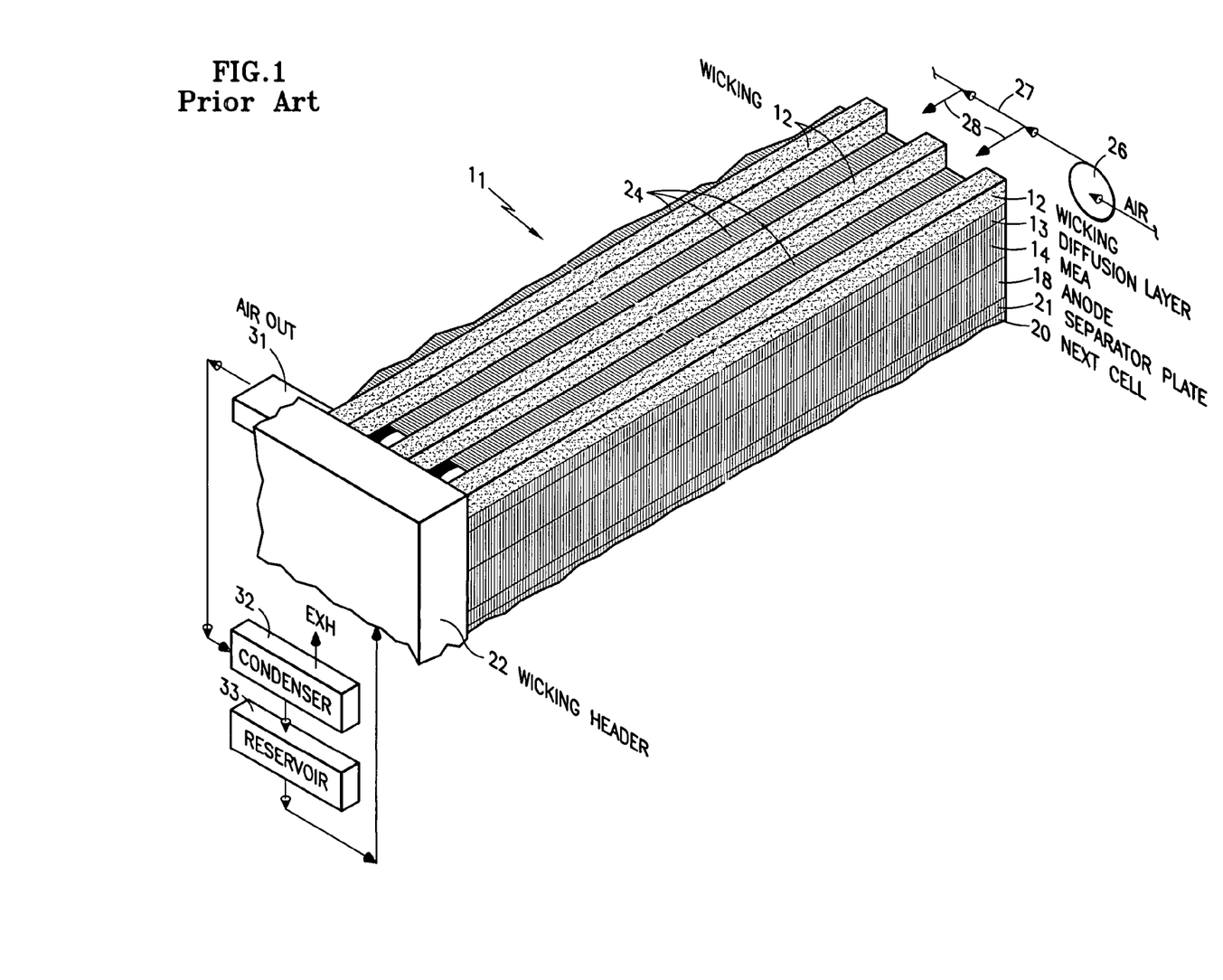
FIG. 1 is a partial, perspective illustration of an evaporatively cooled fuel cell employing wicking known to the prior art.

In FIG. 1, the air flow is exhausted through an outlet header 31 to a condenser 32 which vents the air to exhaust and delivers the condensate to a reservoir 33. Water in the reservoir 33 is conducted to the wicking header 22.

The wicking evaporative cooling described in the aforementioned publication is stated to require external water, from a source outside the fuel cell power plant, since the water generated at the cathode (process water) is said to be insufficient, except at startup, to achieve the necessary cooling. This is also true in an evaporatively cooled fuel cell stack which relies on wicking in U.S. Pat. No. 4,826,741. Therein, 100 $cm^2$ cells have performance of only 0.7-0.8 v at 100-120 $mA/cm^2$ (108-130 $A/ft^2$). Furthermore, the capillary pressure differential along the length of each of the wicks must be greater than the pressure drop along the adjacent air flow field channels in order for there to be a positive wicking velocity, although it is stated that having air flow in the same direction as the flow of water in the wicking means would overcome that problem.

Thus, evaporative cooled fuel cells that rely on wicking require external water, have limited planform size and the performance thereof is limited by small current density.

In order to transport sufficient water to provide the necessary evaporative cooling, from the wicking header 22, located at the perimeter of the cells, to all areas of the cells requiring cooling, the wicking required is considerable, causing each fuel cell to be thicker than is acceptable within the limited volume which is mandated for use in vehicular applications.

DISCLOSURE OF INVENTION

Objects of the invention include: fuel cells which are thinner than fuel cells known to the prior art; the use of evaporative cooling in fuel cells in which the supply of water to the fuel cells is controllable independently of the pressure in the air supply; evaporative cooling of fuel cells in which the supply of water to the cells is independent of the supply of reactant gas to the membrane electrode assembly of the fuel cells; evaporatively cooled fuel cells capable of having large area planform and capable of operating with high current densities; evaporatively cooled fuel cells that resist freezing of components when under no load or low load in subfreezing weather; and improved fuel cells for vehicular and other applications.

According to the present invention, fuel cells in a fuel cell power plant are evaporatively cooled by water supplied in minute passageways, which may comprise a material having in-plane (that is, parallel to the gas flow) permeability to water, which are adjacent to or within a first surface of the hydrophilic porous reactant gas flow field plates that have reactant gas flow channels opening at opposite surfaces of the flow field plate. Each minute passageway is in fluid communication with a water reservoir which may receive condensate from the cathode exhaust.

In accordance with a preferred embodiment of the present invention, the water supply to the minute passageways may be further enhanced by means of a vacuum pump. The pump simply provides a correct pressure in the portions of the passageways of the stack to assure that the water level will reach all parts of the passageways in the stack. In some embodiments, water may flow through the passageways to enhance bubble removal and/or to provide flow through a water clean-up system, such as a de-ionizer. However, the invention may also be practiced with the water passageways being dead-ended.

In accordance with another optional embodiment of the invention, a fuel cell stack utilizing evaporative cooling with water supplied to the surface of hydrophilic porous reactant gas channel plates, may be operated with fixed air flow, in contrast with a fixed air utilization, the air flow being sufficient to control the maximum stack temperature at moderately high current densities. In further accord with this optional embodiment of the invention, the air flow rate may be controlled in stages, in dependence upon the temperature within the fuel cells.

In the invention, water passes from the aforementioned minute passageways or permeable material through the flow field plate perpendicular to the plane thereof, in contrast with wicking of the prior art, which conducts water in parallel with the plane of the fuel cells. Therefore, the water travels only a very short distance from the minute passageways or permeable material through porous material to the surface of the reactant channels where it evaporates, typically less than 0.5 mm.

The invention allows managing the water for evaporative cooling separately from the pressure drop across the reactant gas flow path into which the water will migrate. The invention allows individual fuel cells to be thinner than those of comparable performance known to the prior art.

The condenser may use uncontrolled ambient air to cool the cathode exhaust, or the amount of air may possibly be controlled in relation to the air exhaust temperature from the stack; in other embodiments, the cathode exhaust may be cooled by heat exchange with another fluid, such as a liquid which is freeze-proof within the expected operating environment, the amount of liquid passing through the heat exchanger being controllable.

Other objects, features and advantages of the present invention will become more apparent in the light of the following detailed description of exemplary embodiments thereof, as illustrated in the accompanying drawing.

MODE(S) FOR CARRYING OUT THE INVENTION

Figure 2:
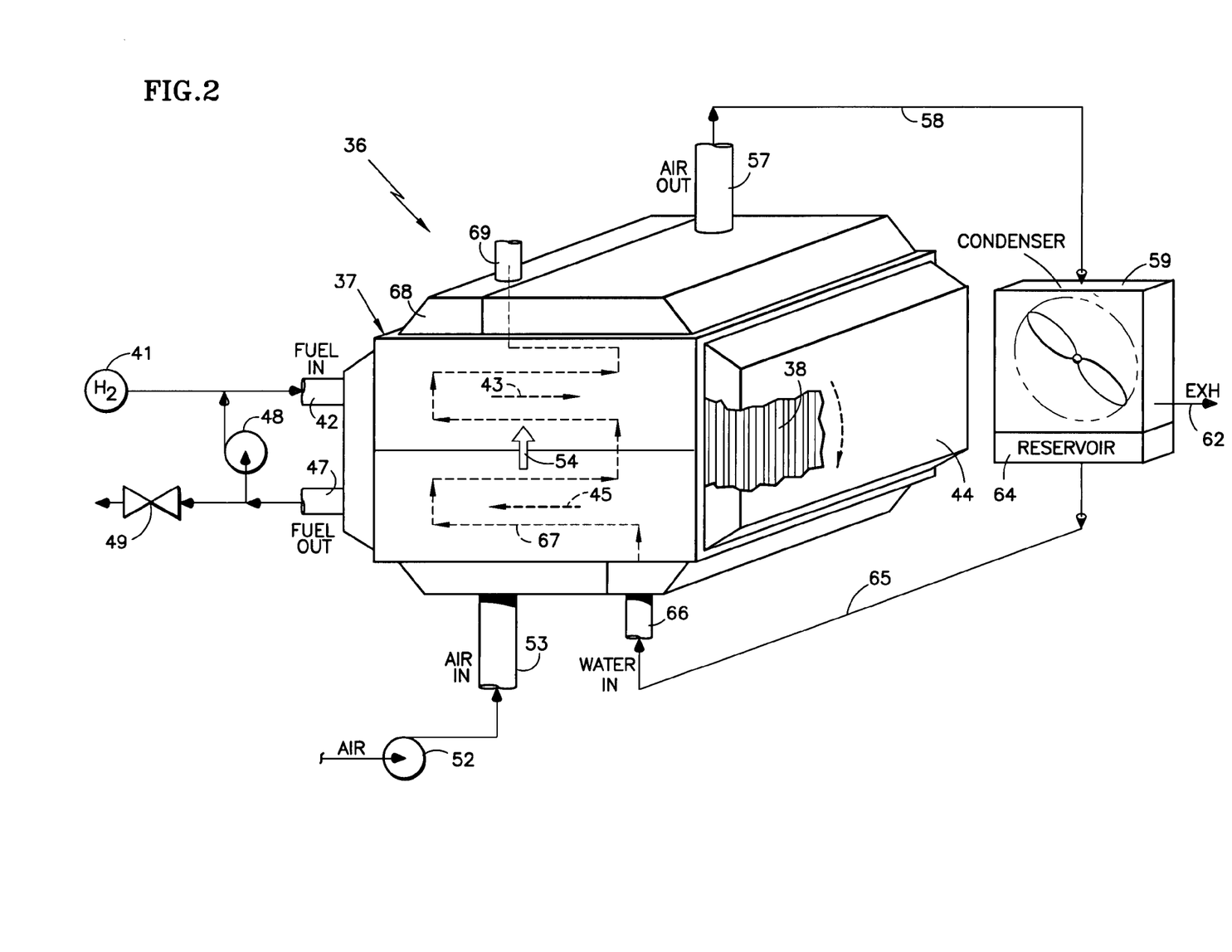
FIG. 2 is a simplified perspective view of a fuel cell power plant employing the present invention.

Referring now to FIG. 2, a fuel cell power plant 36 according to the present invention includes a stack 37 of fuel cells 38 which are shown disposed vertically, although they may be disposed horizontally.

In this embodiment, fuel from the source 41 is provided to a fuel inlet 42 and flows to the right in a first fuel pass, as indicated by the bold arrow 43, to a fuel turn manifold 44. The fuel gas then flows downwardly and into a second fuel pass of the fuel flow fields, wherein the fuel gas flows to the left as indicated by the bold arrow 45. From a fuel outlet 47, the fuel may flow through a recycle pump 48 (perhaps with valves not shown) back to the fuel inlet 42, and may be periodically purged to ambient through a valve 49, all as is known in the art. Single pass, triple pass or other fuel flow configurations may be used.

In the embodiment of FIG. 2, air is provided by a pump 52 to an air inlet 53, and the air flows upwardly through the oxidant reactant gas flow channels of the fuel cells 38, as indicated by the hollow arrow 54. From an air outlet 57, the air flows over a conduit 58 to a condenser 59, which in a vehicle may be a conventional radiator. The exit air is passed through an exhaust 62. The condensate from the condenser 59 may be conducted (directly or in a conduit 63 shown in FIG. 4) for accumulation in a reservoir 64, which is connected by a water return conduit 65 to a water inlet 66. The water then flows through fluid conduits, typically minute passageways 67, into each of the fuel cells 38; the passageways 67 may terminate in a vent manifold 68, from which removal of gas from the passageways is provided through a vent, such as a porous hydrophobic-plug vent 69; or, when suitable in any given case, the passageways may be dead-ended.

Figure 3:
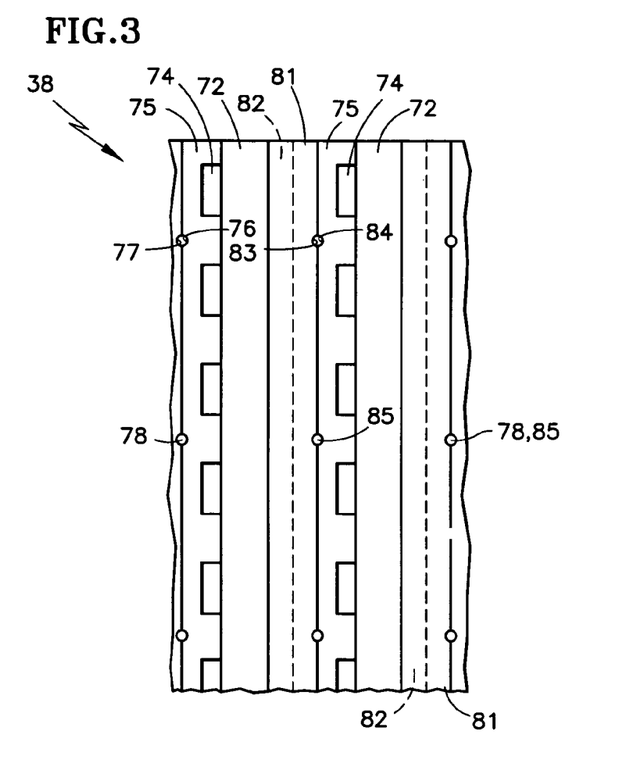
FIG. 3 is a partial, sectioned side elevation view of a pair of fuel cells employing the present invention, with sectioning lines omitted for clarity.

Although there is a water inlet 66, there is no water outlet, the water is simply present in each fuel cell as described more fully with respect to FIG. 3. In FIG. 3, one embodiment of the invention includes fuel cells 38, each of which comprises a conventional membrane electrode assembly 72, which includes an electrolyte with anode and cathode catalysts on opposite sides thereof and may include a gas diffusion layer on one or both electrodes.

In the embodiment of FIG. 3, fuel reactant gas flows through channels 74 in a fuel reactant gas flow field plate 75, which in this embodiment includes grooves 76, which together with grooves 77 of an adjacent fuel cell, form a minute water passageway 78. On the cathode side, an oxidant reactant gas flow field plate 81 includes air flow channels 82 and grooves 83 which, with grooves 84 on an adjacent fuel cell, together form minute passageways 85.

To prevent flooding, it is preferable that the reactant gases be at least a few Kilopascals higher than the pressure of water in the passageways. This will naturally occur as a consequence of the air pump 52 generally causing the air to be that much above atmospheric pressure, and the pressure of the fuel is easily regulated, as is known. In the embodiment of FIG. 2, the water in the conduit 65 is at atmospheric pressure. However, the water could be provided at a pressure other than atmospheric, by a variety of conventional means, provided the reactant gases have a slightly higher pressure as described. If appropriate in any circumstance, the accumulator 64 may be eliminated and the condenser condensate fed directly to the water inlet 66.

In other embodiments, the passageways may be formed other than by matching grooves as shown. Water passageways 67 may be provided in only one of the reactant gas flow field plates 75, 81. The invention may be used in fuel cell stacks having solid separator plates; or if deemed necessary, cooler plates, in which case the coolant flow therein is fully independent of the evaporative cooling of the present invention.

The reactant gas flow field plates 75, 81 appear to be the same as water transport plates, sometimes referred to as fine pore plates, in a fuel cell power plant which utilizes significant water flow through the water transport plates, with external water processing, as is disclosed in U.S. Pat. No. 5,700, 595. However, because there is about a one hundred-to-one improvement in cooling effectiveness per volume of water when evaporative cooling is used, in comparison with the sensible heat water flow cooling of the aforesaid '595 patent, the water flow channels in the prior art have cross sections which are several tens of times larger than the cross sections of the water passageways 78, 85 of the invention. In addition, the spacing of the lateral portions of the water passageways 78, 85 (shown at each juncture of the fuel cells in the embodiment of FIG. 3) and similar flow passageways in other embodiments, may be separated by a distance which is several times greater than the spacing between lateral portions of water flow channels in sensible heat, water flow cooling systems, as in the aforesaid patent. The small cross section of the water passageways 78, 85, and the large distance between successive lateral portions thereof permit the thickness of the reactant gas flow field plates 75, 81 to be reduced by about one-third.

Figure 4:
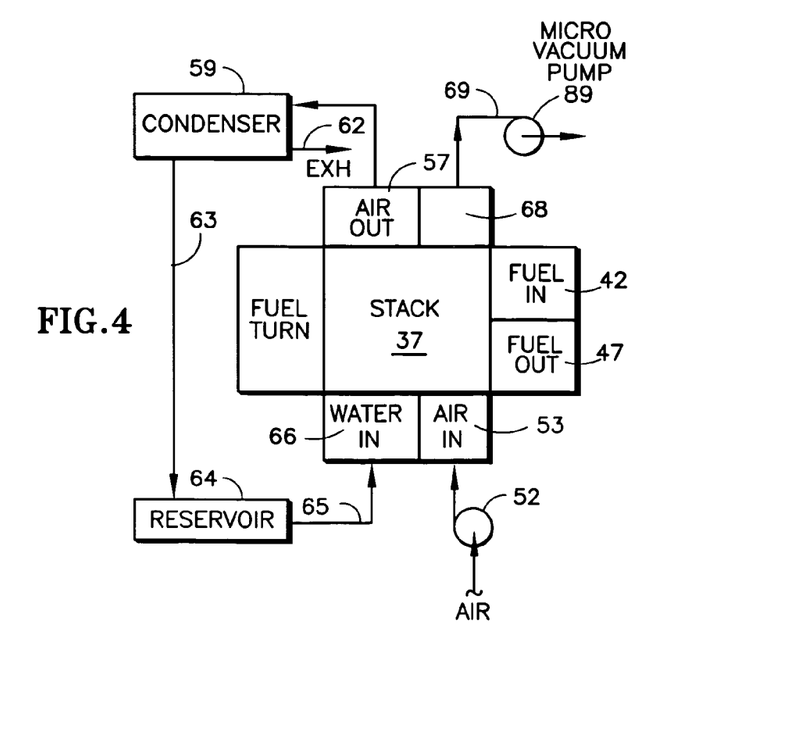
FIG. 4 is a simplified block diagram of a vented embodiment of the invention.

Another embodiment of the invention is illustrated in FIG. 4. The condenser 59 is connected by a line 63 to the reservoir 64. Therein, the vent manifold 68 is connected to a vacuum pump 89, for example the microvacuum type utilized for an aquarium, for the purpose of supplying sufficient vacuum to ensure that the water level reaches the uppermost portions of the passageways in the stack 37. In some embodiments, the pump 89 may not cause any water flow through the vent manifold 68. However, in some embodiments a small flow of water may be necessary to assist gas bubbles to reach the vent and clear the in-stack water passages. That flow may for instance be in the range of about 3%-30% of the mass flow rate of water evaporating into the reactant channels.

Figure 5:
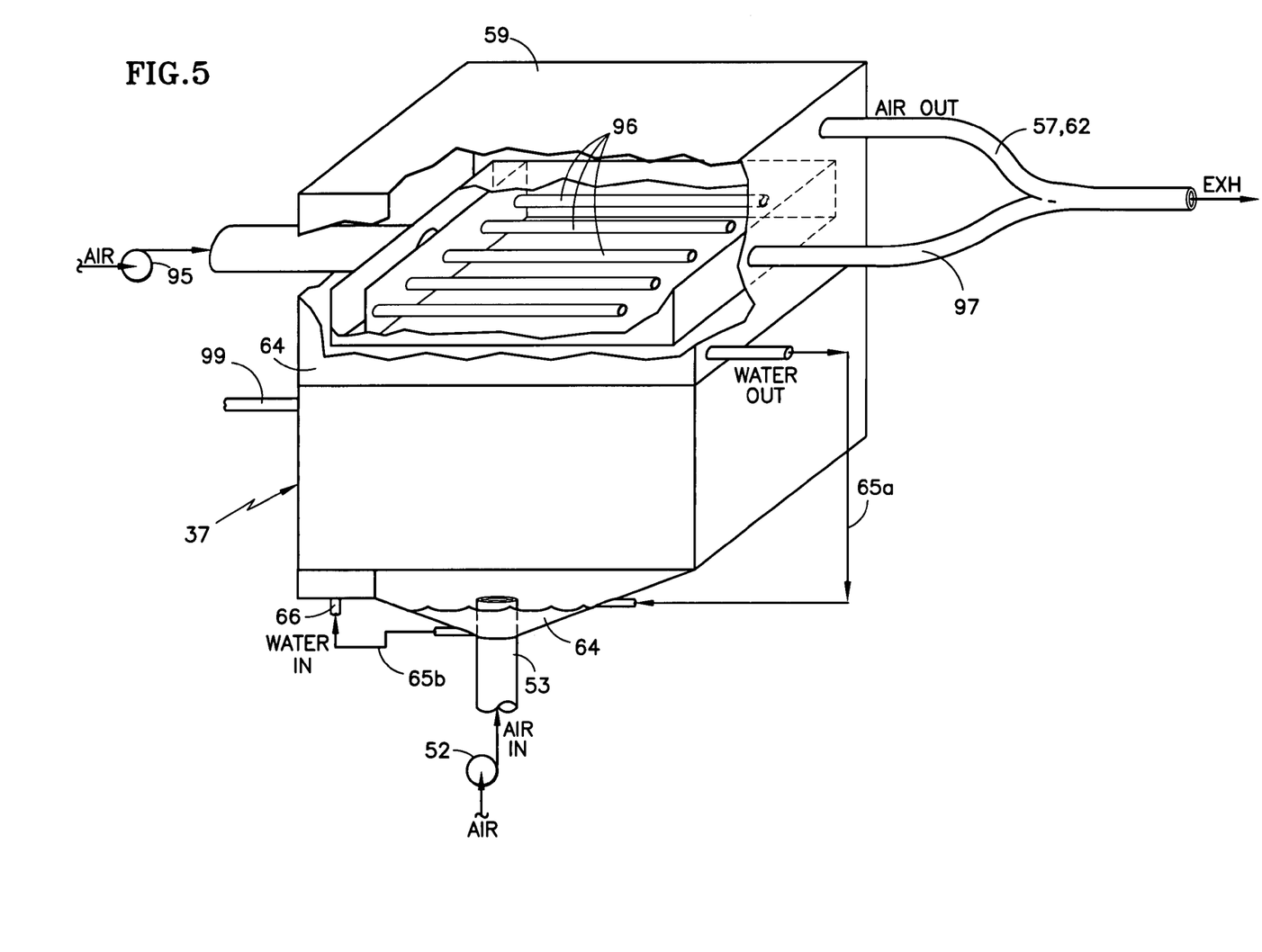
FIG. 5 is a partial illustration of an embodiment of the fuel cell power plant 36 of FIG. 2, in which the air outlet manifold comprises a condenser disposed contiguously with the top of the fuel cell stack.

In FIG. 5, the fuel cell stack has a condenser 59 disposed contiguously across the top thereof, said condenser 59 comprising a reactant air outlet manifold to cool the stack air exhaust. In order to condense entrained water, a blower 95 pumps air through a plurality of cooling tubes 96 which vent through conduit 97 to the cathode exhaust. The condensate is fed through line 65a to a reservoir 64 which comprises a combined accumulator/air inlet manifold, which is connected to the water feed inlet 66 by a conduit 65b. Should the water in the reservoir 64 not provide adequate pressure so that the highest portions of the passageways 67 (FIG. 2) have water therein, then the passageways 67 may be connected to a vent 99 to reference the water pressure to atmospheric pressure; or it may be connected through the vent 99 to a micro vacuum pump 89 (FIG. 4), simply to supply additional pressure differential, as described with respect to FIG. 4 hereinbefore. In FIG. 5, the fuel components have been omitted for clarity. It should be noted that other configurations and cooling fluids could be used in the condenser.

Figure 6:
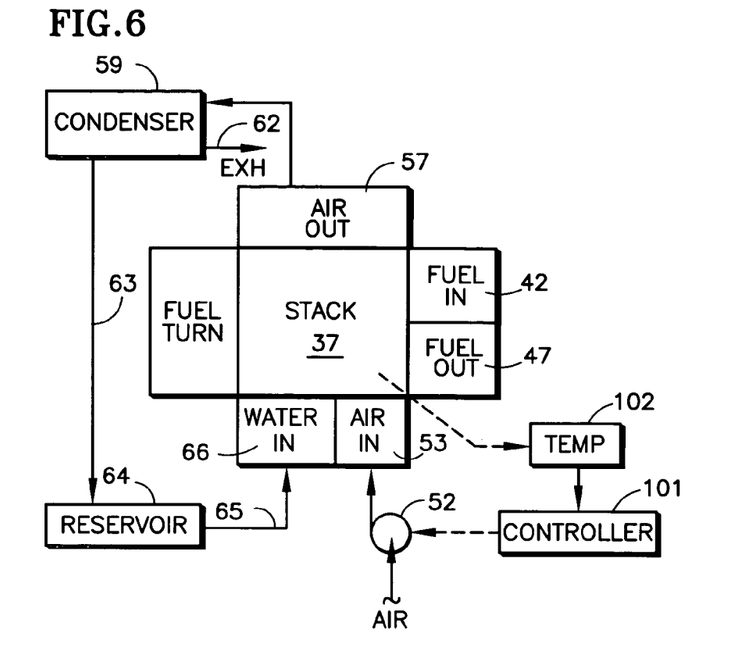
FIG. 6 illustrates controlling air flow as a function of temperature.

In FIG. 6, a controller 101 will regulate the flow of air depending on the temperature 102 of one or more cells of the stack. The control could be continuous or in stages. Or, if desired, the control could simply be to maintain a constant air flow (rather than maintaining constant air utilization) that ensures sufficient evaporative cooling at the stack higher current densities to maintain the desired temperature set point. In this way the average cell temperature will be reduced thus extending stack life.

Figure 7:
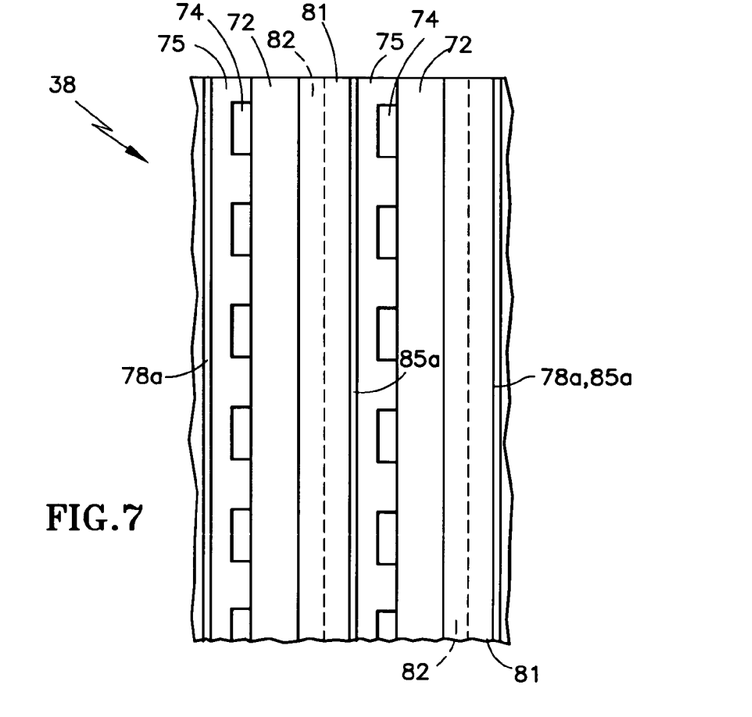
FIG. 7 is a partial, sectioned side elevation view of a pair of fuel cells employing a water permeable plane in the present invention, with sectioning lines omitted for clarity.

FIG. 7 illustrates another embodiment of the invention; in place of grooves forming passageways, there is a material 78a, 85a, which is conductive, hydrophilic and has a high permeability to water, extending over substantially the entire planform of the reactant gas flow field plates 71, 85. Such material may be carbon fiber paper, with fibers aligned in the direction of water motion to help with in-plane water permeability, or it may be other material conventionally used as fuel cell diffusion media. This contrasts with the prior art, as in the aforementioned patent publication, in which the reactant gas flow field plates are impermeable, with spaced-apart strips of water-permeable material defining air flow channels between the strips. In that case, any water pressure will cause flooding. In the invention, the pressure (head) of water can be whatever is reasonably necessary to assure replenishment throughout the stack, while the reactant gas pressure can be higher than the water pressure to avoid flooding.

Figure 8:
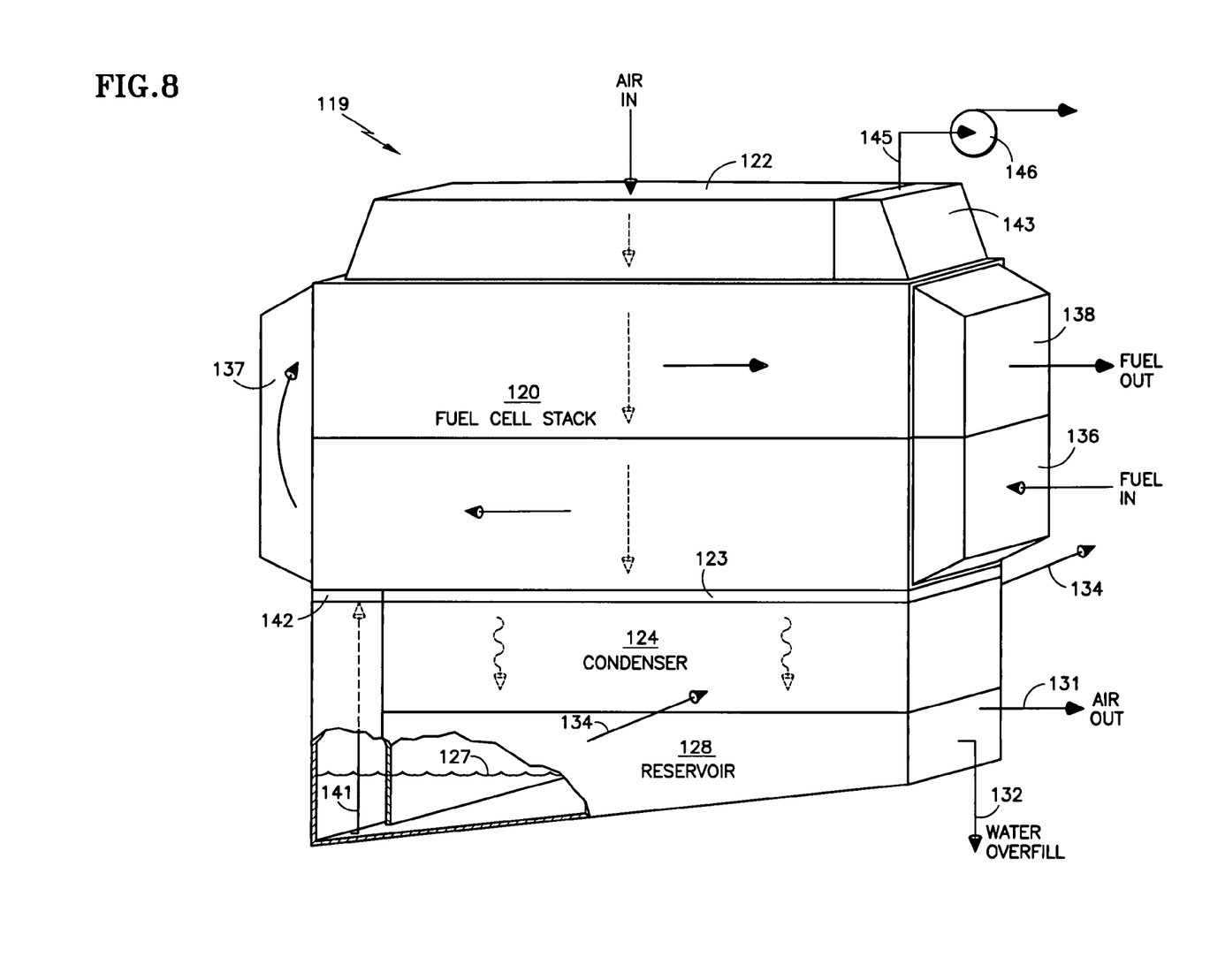
FIG. 8 is a simplified, perspective view of a fuel cell power plant employing another embodiment of the present invention with downward oxidant reactant gas flow.

FIG. 8 illustrates a portion of a fuel cell power plant 119 in which the invention may be embodied having a downflow configuration including a fuel cell stack 120. Air is provided to an air inlet manifold 122 and proceeds through the oxidant flow channels to an air exit manifold 123 and thence into a condenser 124. The outflow from the condenser 124 is above the water line 127 of a reservoir 128. The cooled air is expelled at an air outlet 131, which may also comprise, or otherwise be adjacent to, a water overfill 132. The coolant for the condenser 124 may comprise ambient air as illustrated by arrows 134.

Fuel provided to a fuel inlet manifold 136 flows to the left, then through a fuel turn manifold 137, after which it flows to the right and out through a fuel exit manifold 138.

Water from the reservoir 128 flows through a water conduit 141 to a lower water manifold 142. The water passes into water channels 67 (as described with respect to FIG. 2 hereinbefore) to the top of the fuel cell stack, and possibly into an upper water manifold 143.

The embodiment of FIG. 8 employs evaporative cooling, with no water flowing out of the upper water manifold 143. The only water entering through the lower water manifold 142 is to replace that which is evaporated into the air channels, as described with respect to FIGS. 2 and 3 hereinbefore. A conduit 145 provides a fluid communication to a micro vacuum pump 146, which does not conduct any liquid from the manifold 143, but simply applies sufficient vacuum pressure to ensure that water will rise through all the water channels in the stack. The micro vacuum pump 146 may, for instance, comprise a simple pump of the type used on small aquariums, costing only a few U.S. dollars.

To prevent flooding, it is preferable that the reactant gases be at least a few Kilopascals higher than the pressure of water in the passageways. This will naturally occur during operation of the fuel cell power plant as a consequence of a conventional air pump (not shown) generally causing the air to be that much above atmospheric pressure, and the pressure of the fuel is easily regulated, as is known. In the embodiment of FIG. 8, the water in the channels is at about atmospheric pressure. However, the water could be provided at a pressure other than atmospheric, by a variety of conventional means, provided the reactant gases have a slightly higher pressure as described.

Figure 9:
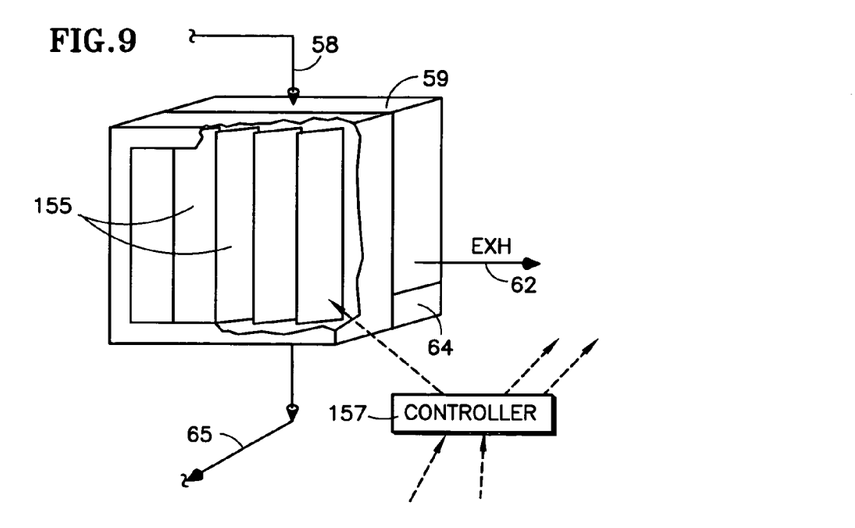
FIG. 9 is a partial, simplified perspective view of an alternative form of external condenser for use with the invention.

In accordance with another aspect of the invention illustrated in FIG. 9, the likelihood of condensate in the reservoir 64 and water in the conduit 65 freezing is reduced in situations where the fuel cell powers an electric vehicle and the condenser is essentially the radiator of the vehicle. When the ambient temperature is below freezing and the load is very low, such as going down a steep hill, the waste heat of the exhaust air can be very low because there is little product water being generated and evaporated, and whatever water is evaporated may actually freeze in the condenser 59, and/or in the conduit 65 that leads back to the fuel cell stack. To avoid this, an air flow controller, for example a plurality of shutters or other air flow control means 155 are disposed at the ambient air inlet side of the condenser 59 and are controlled by a controller 157 so that the air flow through the condenser is reduced under conditions of cold temperatures and low loads. When the load is high, the cathode exhaust in the conduit 58 is warm, so the controller 157 may open the shutters 155, even if the outside air temperature is low. Also, when the outside air temperature is high, the controller 157 may leave the shutters open even if the load is low and the exhaust air in the conduit 58 is cool.

Figure 10:
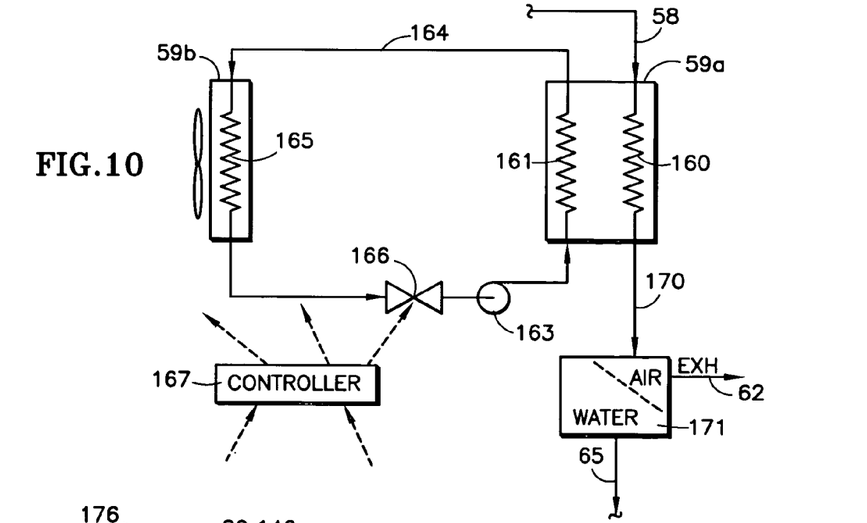
FIG. 10 is a stylized, simplified block diagram of an embodiment of the invention employing a secondary heat exchange loop with the condenser.

Another manner of avoiding freezing of the condensate is illustrated in FIG. 10. Therein, a condenser 59a comprises a heat exchanger with one coil (or other conduit) 160 having cathode exhaust air flowing therethrough and the other coil (or conduit) 161 having a fluid, such as a water/glycol mix that will not freeze, flowing therethrough. In this exemplary embodiment, a glycol mix is provided to the coil 161 by a pump 163, which causes flow of the glycol mix through a conduit 164 to an ambient air heat exchanger 59b having a coil (or conduit) 165. Flow from the coil (or conduit) 165 is through a valve 166 that is controllable by a controller 167 so that, when there is a low load in cold temperature, the valve 166 can be closed substantially or entirely, thereby not cooling the cathode exhaust flowing from the conduit 58 through the coil 160. In warm weather or with high loads, the controller 167 can open the valve 166 to provide coolant to the coil (or conduit) 161 thereby cooling the cathode exhaust flowing through the coil (or conduit) 160.

The outflow of the coil (or conduit) 160 is carried by a conduit 170 to an air/water separator 171; the air passing to ambient through exhaust 62 and the water passing back to the fuel cell stack through the conduit 65. Thus, the condenser can have uncontrolled ambient air, controlled ambient air or a fluid such as a freeze-proof liquid to cool the cathode exhaust.

Figure 11:
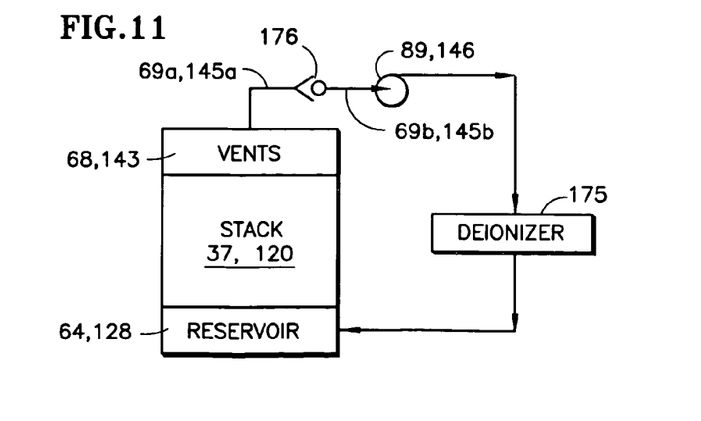
FIG. 11 is a simplified diagrammatic illustration of an embodiment of the invention employing a deionizer.

Another embodiment of the invention is illustrated in FIG. 11. Therein, a deionizer 175 (sometimes called a "demineralizer") and a check valve 176 are added to those embodiments described hereinbefore which have vents 68, 143 at the top of the stack 37, 120. In those embodiments, the lines 69a, 145a lead to the check valve 176 and the lines 69b, 145b lead from the check valve to the related pump 89, 146. The deionizer 175 is in fluid communication between the pump 89, 146 and the reservoir 64, 128. Thus, some fraction of the water, which may be on the order of about 3%-30% f the mass flow of evaporated water, is drawn from the stack 37, 120 and passed through the deionizer 175, and then returned to the stack 37, 120 through the reservoir 64, 128. Some of the water flow may bypass the deionizer 175 by controlling a bypass valve around the deionizer 175 as is known in the art. A deionizer may instead be connected, typically with by-pass flow control, to the outlet of the condenser, in some em÷odiments. It is also possible to maintain the water flow concept without the deionizer if small water circulation is desired for other purposes such as gas removal.

The check valve 176 is optional, and is provided so as to prevent water which is stored within the channels inside the stack, when the fuel cell power plant is shut down, from "drooping" into the reactant gas flow field channels, through the hydrophilic porous plates (commonly referred to as "water transport plates") within which the water passageways and reactant gas flow field channels are formed.

Water may be drained from passageways and the condenser at shut down in cold climates, if desired. Instead of using the pump 89, 146, the flow through the deionizer 175 can be driven by convection, since the temperature of the deionizer 175 is lower than the temperature of the stack 37, 120. Convection may be enhanced with a heat exchanger in series with the deionizer 175, if desired.

The aforementioned patent application and patent are incorporated herein by reference.

Thus, although the invention has been shown and described with respect to exemplary embodiments thereof, it should be understood by those skilled in the art that the foregoing and various other changes, omissions and additions may be made therein and thereto, without departing from the spirit and scope of the invention.

We claim:
1. A fuel cell power plant comprising:
a stack (37, 120) of fuel cells, each fuel cell including an electrode assembly (72) including an electrolyte having cathode and anode catalysts disposed on opposite sides thereof, a fuel reactant gas flow field plate (75) having fuel reactant gas flow channels (74) extending from a first surface thereof, an oxidant reactant gas flow field plate (81) having oxidant reactant gas flow channels (82) extending from a first surface thereof, at least one of said flow field plates being porous and hydrophilic, and a water passageway (67; 78, 85; 78a, 85a) disposed on or near a second surface of said at least one flow field plate which is opposite to said first surface thereof;
characterized by:
said water passageway either being (a) dead-ended within the corresponding fuel cell or (b) vented (69, 89, 99, 145), said water passageway consisting of either (c) at least one fluid conduit (67; 78, 85) disposed on or near said second surface or (d) a material (78a, 85a) contiguous with substantially all of said second surface, said material being conductive, hydrophilic and permeable to water; and
said fuel cell power plant further comprising:
a condenser (59, 124) connected to a reactant gas exit of at least one of said fuel cells, the condensate of said condenser in fluid communication with the water passageways of said fuel cells, whereby water migrates from said water passageways through each of said at least one hydrophilic, porous reactant gas flow field plates and is evaporated to cool said fuel cells.
2. A fuel cell power plant according to claim 1 wherein:
each fuel cell has a groove (76, 77; 83, 84) in said first surface of either or both said fuel reactant gas flow field plate (75) and said oxidant reactant gas flow field plate (81), which form said water passageways (78, 85) when the fuel cell stack is assembled.
3. A fuel cell power plant according to claim 1 wherein:
said condenser (59) is disposed separately (FIG. 2) from said fuel cell stack.
4. A fuel cell power plant according to claim 1 wherein:
the air flow in said condenser (59, 124) is vertical.
5. A fuel cell power plant according to claim 1 disposed in a vehicle wherein:
said condenser (59) comprises a vehicle radiator (FIG. 2).
6. A fuel cell power plant according to claim 5 wherein:
said condenser (59, 124) has a water reservoir (64, 128) disposed contiguously at the bottom thereof.
7. A fuel cell power plant according to claim 1, further comprising:
a water reservoir (64, 128) receiving said condensate, said passageways (67; 78, 85; 78a, 85a) in fluid communication with said reservoir.
8. A fuel cell power plant according to claim 1 wherein:
said water passageways (67; 78, 85; 78a, 85a) are each connected to a vent (69, 89, 99, 145).
9. A fuel cell power plant according to claim 8 wherein:
said vent (69, 99) is at atmospheric pressure.
10. A fuel cell power plant according to claim 8 wherein:
the water pressure at said vent (69, 86, 99, 145) is less than or equal to the water pressure at the condenser (59, 124) exit.
11. A fuel cell power plant according to claim 10 wherein:
the water pressure at said vent (69, 86, 99, 145) is less than the water pressure at the condenser (59, 124) exit; and the liquid pressure difference is achieved by pressure of the condenser exhaust gas which pushes water into the water passageways (67; 78, 85; 78a, 85a).

12. A fuel cell power plant according to claim 10, further comprising:
a water reservoir (64, 128) receiving said condensate, said passageways in fluid communication with said reservoir (64, 128); and wherein:
hydraulic pressure of the water in the condenser (59, 124) pushes water into the water passageways (67; 78, 85; 78a, 85a).

13. A fuel cell power plant according to claim 10, wherein:
the liquid pressure at said vent (69, 89, 99, 145) is sufficiently less than the water pressure at the condenser exit (59, 124) to provide a flow of water out of the vent.

14. A fuel cell power plant according to claim 13 further characterized by:
a demineralizer (175) receiving a flow of water out of the vent (69, 99, 145), water flowing out of said demineralizer being returned to the proximal ends of said passageways with said condensate.

15. A fuel cell power plant according to claim 14 further characterized by:
a check valve (176) disposed in fluid communication between said passageways and said demineralizer to permit water to flow from said vent only toward said demineralizer.

16. A fuel cell power plant according to claim 8 further comprising:
a vacuum pump (89, 146) connected to said vent and operated in a manner to ensure coolant level reaches all portions of said water passageways (67; 78, 85; 78a, 85a).

17. A fuel cell power plant according to claim 8 further comprising:
a vacuum pump (89, 146) connected to said vent and operated in a manner to ensure coolant level reaches all portions of said water passageways (67; 78, 85; 78a, 85a) without creating flow of water through said vent (69, 89, 99, 145).

18. A fuel cell power plant according to claim 8 further comprising:
a vacuum pump (89, 146) connected to said vent and operated in a manner to ensure coolant level reaches all portions of said water passageways (67; 78, 85; 78a, 85a) and providing flow of water through said vent (69, 89, 99, 145).

19. A fuel cell power plant according to claim 18 further characterized by:
a demineralizer receiving a flow of water out of the vent, water flowing out of said demineralizer being returned to said passageways.

20. A fuel cell power plant according to claim 1 wherein:
said condenser (59, FIG. 5) is contiguous with and covers the top of said stack (37).

21. A fuel cell power plant according to claim 1 wherein:
said condenser (59, FIG. 5) is below said stack (120).

22. A fuel cell power plant according to claim 21 wherein:
said condenser (124) is contiguous with the bottom of said stack (120).

23. A fuel cell power plant according to claim 1 wherein:
said stack (37) of fuel cells includes an air inlet manifold (64), the condensate of said condenser (59) being in fluid communication (65a) with said air inlet manifold, whereby said air inlet manifold serves as a reservoir, said water passageways (67; 78, 85; 78a, 85a) being in fluid communication (65b) with the water in said reservoir.

24. A fuel cell power plant according to claim 1 wherein:
water evaporates into the air flowing in said oxidant reactant gas channels and the air flow in said channels is held constant (101, 52) at all power levels.

25. A fuel cell power plant according to claim 1 wherein:
water evaporates into the air flowing in said oxidant reactant gas channels and the air flow in said channels is controlled (101, 52) as a function of cell temperature (102).

26. A fuel cell power plant according to claim 1 wherein:
said condenser is selected from (e) a heat exchanger (59) cooled by an uncontrolled flow of ambient air, (f) a heat exchanger (59) cooled by controlled (155, 157) flow of ambient air, and (g) a heat exchanger (59a) cooled (161) by a fluid other than ambient air.

27. A fuel cell power plant according to claim 26 wherein:
said condenser is a heat exchanger (59) cooled by ambient air having an air flow controller (155, 157) to control the flow of ambient air therethrough.

28. A fuel cell power plant according to claim 27 wherein:
said air flow controller (155, 157) comprises shutters (155).

29. A fuel cell power plant according to claim 26 wherein:
said condenser is a heat exchanger (59a) cooled (161) by a antifreeze liquid coolant.

30. A fuel cell power plant according to claim 29 wherein:
the amount of said liquid coolant flowing through said condenser is controlled (166) by a controller (167).

31. A fuel cell power plant according to claim 29 wherein:
said liquid coolant is cooled by ambient air in another heat exchanger (165).

* * * * *